L. J. STERN.
METHOD OF STOPPING LEAKS IN AUTOMOBILE RADIATORS AND OTHER RECEPTACLES.
APPLICATION FILED DEC. 18, 1917.
1,281,690.
Patented Oct. 15, 1918.
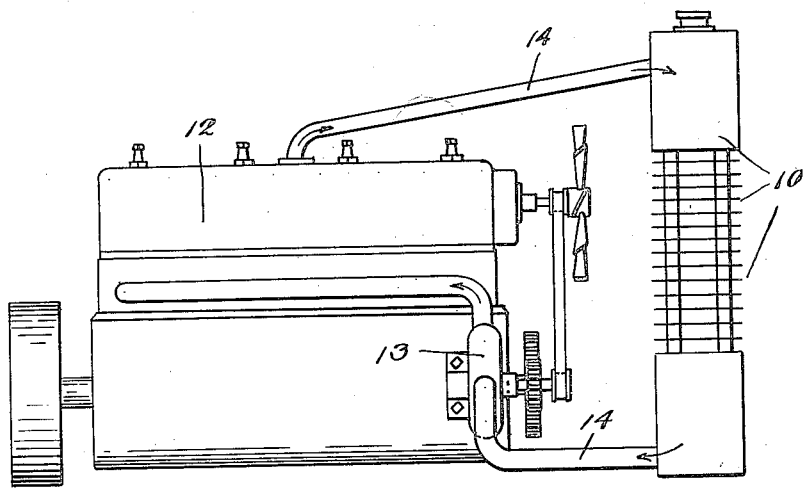
Inventor.
Louis J. Stern
by
B. J. N____ atty

UNITED STATES PATENT OFFICE.

LOUIS J. STERN, OF BOSTON, MASSACHUSETTS, ASSIGNOR TO EDWARD R. TOLFREE, OF BOSTON, MASSACHUSETTS.

METHOD OF STOPPING LEAKS IN AUTOMOBILE-RADIATORS AND OTHER RECEPTACLES.

1,281,690.     Specification of Letters Patent.     Patented Oct. 15, 1918.

Application filed December 18, 1917. Serial No. 207,770.

*To all whom it may concern:*

Be it known that I, LOUIS J. STERN, a citizen of the United States, and resident of Boston, county of Suffolk, and State of Massachusetts, have invented an Improvement in Methods of Stopping Leaks in Automobile-Radiators and other Receptacles, of which the following is a specification.

This invention relates to a method of stopping leaks in metal vessels containing water, such for instance as steam and water boilers, automobile radiators, and systems including such devices, which involves the employment of a leak stopping ingredient which with water is adapted to form a colloidal solution.

A composition especially prepared for this purpose forms the subject matter of my application #185,532, filed Aug. 10, 1917, but in lieu thereof other compositions and compositions containing other leak stopping ingredients which are adapted to form a similar colloidal solution with the water contained in the vessel may be employed.

In order that my invention may be understood I will first briefly describe the composition referred to in my said application.

The essential constituent of the composition is a substance commercially known as cube gambier, which is an extract from certain trees or shrubs and contains catechin and tannin, although other bark extracts containing catechin or similar compounds may be employed or substances having similar characteristics.

The composition may be produced in the following manner; the gambier may be liquefied by heat and while hot may be added to a mixture of seven parts by weight of alcohol and one part by weight of water. This mixture may be placed in a closed vessel and agitated and heated for say 24 hours, and the temperature may be gradually increased until the contents reach about 350 degrees F., at which time a considerable pressure will be developed, then the temperature is reduced to about 35 degrees F., whereupon a colloidal solution is formed which may be placed in cans for shipment, the gambier, which is the leak stopping ingredient being in a colloidal state.

This colloidal solution may be poured into the vessel containing water, as for instance into an automobile radiator; and the water may be heated at the moment said solution is added or may be subsequently heated, or may be cold, but the solution is more quickly and effectively mixed with or distributed throughout the water contained in the vessel if said water is hot or subsequently heated. Furthermore, as the water contained in the vessel may, before vaporizing, be carried to a temperature higher than the vaporizing point of the solvent of the colloidal solution, it will be noted that if these extreme temperatures exist the colloidal solution when added will be very active and the suspended particles moved about quickly and positively so as to be driven against the wall of the vessel and caused to congregate at a leak opening and there subjected to exposure to the air, whereupon it hardens and tightly closes or seals the leak opening forming insoluble closures thereat.

Instead of previously preparing a colloidal solution such a solution may be formed with the water contained in the vessel as a solvent.

The colloidal solution of water and leak stopping ingredients thus contained in the vessel will be circulated by any suitable means, such for instance as a pump associated therewith, so that the leak stopping ingredients will be positively moved about and find lodgment at the leak opening and when so disposed will in time be exposed to the air and become hard, and practically insoluble and thus effectively close the opening.

For this purpose it is desirable to keep a colloidal solution in the radiator for several days, and I prefer to keep it there permanently as it will stop other leaks and has other advantages.

The leak stopping ingredients when hardened by exposure to the air become in time almost insoluble in water, which is an important characteristic of the ingredients employed.

Leaky water radiators and water jackets which are cracked may be repaired by this material and the entire cooling system rendered leak proof, rust proof and scale proof.

The drawing illustrates in diagram a water cooling system for an internal combustion engine which includes a radiator.

In the drawing here shown, 10 represents the radiator, 12 the water jacket for the cylinder of the internal combustion engine, 13 a pump, and 14 pipes for connecting the aforesaid elements together to form a complete circulatory cooling system for the engine. This structure is typical of many now in use.

I claim:—

1. The method of stopping leaks in metal vessels containing water which consists in placing a composition comprising a leak stopping ingredient in a colloidal state contained in the water in the vessel and forming with said water a colloidal solution, and circulating said solution to move the leak stopping particles and cause them to enter a leak opening, whereupon they harden upon exposure to the air.

2. The method of stopping leaks in vessels containing water which consists in placing a composition comprising a leak stopping ingredient in a colloidal state contained in the water in the vessel and forming with said water a colloidal solution, heating the solution and circulating the solution to move the leak forming particles and cause them to enter a leak opening, whereupon they harden upon exposure to the air.

3. The method of stopping leaks in vessels containing water which consists in adding a water soluble colloidal solution containing a colloidal leak stopping ingredient to the water contained in the vessel, thereby forming a colloidal solution in said vessel, which, as it enters a leak opening the leak stopping particles find lodgment thereat and harden upon exposure to the air, to effectively seal said opening, and circulating the solution to positively move the leak stopping particles about.

4. The method of stopping leaks in vessels containing water which consists in placing a water soluble composition containing a colloidal leak stopping ingredient in the water contained in the vessel and forming in the vessel a colloidal solution, circulating the solution to move the leak stopping particles about and cause them to engage the wall of the vessel to close a leak opening, said leak stopping particles hardening upon exposure to the air at the leak opening.

5. The method of stopping leaks in vessels containing water which consists in placing a water soluble composition comprising a leak stopping ingredient in a colloidal state and a solvent in the water contained in the vessel and forming in the vessel a colloidal solution, vaporizing the solvent of the composition, circulating the solution to move the leak stopping particles about and cause them to engage the wall of the vessel and to congregate at a leak opening where upon exposure to the air they become hard and effectively close said opening.

6. The method of stopping leaks in vessels containing water which consists in placing a water soluble composition containing a leak stopping ingredient in a colloidal state and a solvent in the water contained in the vessel and forming in the vessel a colloidal solution, heating the solution to a temperature high enough to vaporize the solvent of the composition and circulate the solution to move the leak stopping particles and cause them to engage the wall of the vessel and associated parts and congregate at a leak opening whereupon they subsequently harden by exposure to the air.

7. The method of stopping leaks in metal vessels containing water which consists in placing a composition comprising a leak stopping ingredient in a colloidal state, contained in the water in the vessel and forming with said water a colloidal solution, and circulating said solution to move the leak stopping particles and cause them to enter a leak opening, whereupon they harden upon exposure to the air and form insoluble closures therefor.

In testimony whereof, I have signed my name to this specification, in the presence of two subscribing witnesses.

LOUIS J. STERN.

Witnesses:
H. B. DAVIS,
T. T. GREENWOOD.